April 8, 1952      L. PALAZZO      2,592,178

BEARING FOR TRANSMISSION MECHANISM

Filed March 4, 1946

INVENTOR.
LOUIS PALAZZO
BY
ATTORNEY

Patented Apr. 8, 1952

2,592,178

UNITED STATES PATENT OFFICE 2,592,178

BEARING FOR TRANSMISSION MECHANISM

Louis Palazzo, New York, N. Y.

Application March 4, 1946, Serial No. 651,774

3 Claims. (Cl. 308—207)

This invention relates to transmission mechanisms, particularly to clutch devices adapted to be used in motor-transmission assemblies.

Power driven units, such as sewing machines, usually employ transmission mechanisms in co-operative association with conventional motors so as to permit the intermittent transmission of power from the motor to the device to be driven thereby. Among the numerous known transmission mechanisms is the type having a clutch arrangement of two complementary members, one carrying a drive plate with a friction member thereon, and the other carrying a pulley member engageable with the drive plate and operatively connected to the driven device. In most conventional structures of this category, the pulley member, when not in engagement with the drive plate, is loosely or rotatably mounted upon a shaft which is connected to the motor, the shaft being in rotation together with the drive plate fixedly mounted thereon. The idling pulley is thus mounted over a rotating shaft, an arrangement which frequently causes some unwanted rotation of the pulley due to the friction between it and the shaft, thereby requiring a strong braking device to stop this movement.

It is within the contemplation of my invention to provide a device with the aforesaid disadvantage eliminated, and which will at the same time provide certain advantages which are not to be found in other transmission mechanisms. In this aspect of my invention, it is an important object to employ roller or ball-bearings between the pulley or driven member and the rotating shaft attached to the motor, so that when the pulley is out of engagement with the drive plate and in idling position, there will be a minimum of friction between said pulley and shaft and consequently a minimum tendency for the pulley to rotate when idling—thereby requiring but slight braking effort upon the pulley.

It is also an object of this invention to provide adequate and efficient bearing means between the pulley and the shaft so that the pulley may at all times, whether in its engaged or disengaged position, be firmly supported.

In devices of the above-mentioned class, it is obviously necessary to effect a proper relationship between the motor and the two complementary portions of the clutch, so that the clutch and motor shaft may be in proper axial alignment. But this is not always easy of accomplishment inasmuch as motors and clutches are not always fabricated by the same manufacturers. It is hence another object of my invention to provide an adjustable mounting for the motor and clutch assemblies so that a proper alignment and size adjustment may be made for motors and clutch devices of different proportions.

And it is a further object to enable the accomplishment of the aforesaid objectives by a relatively simple and easily constructed mechanism.

Other objects, features and advantages will appear from the drawing and the description hereinafter given.

Referring to the drawing.

Figure 1:
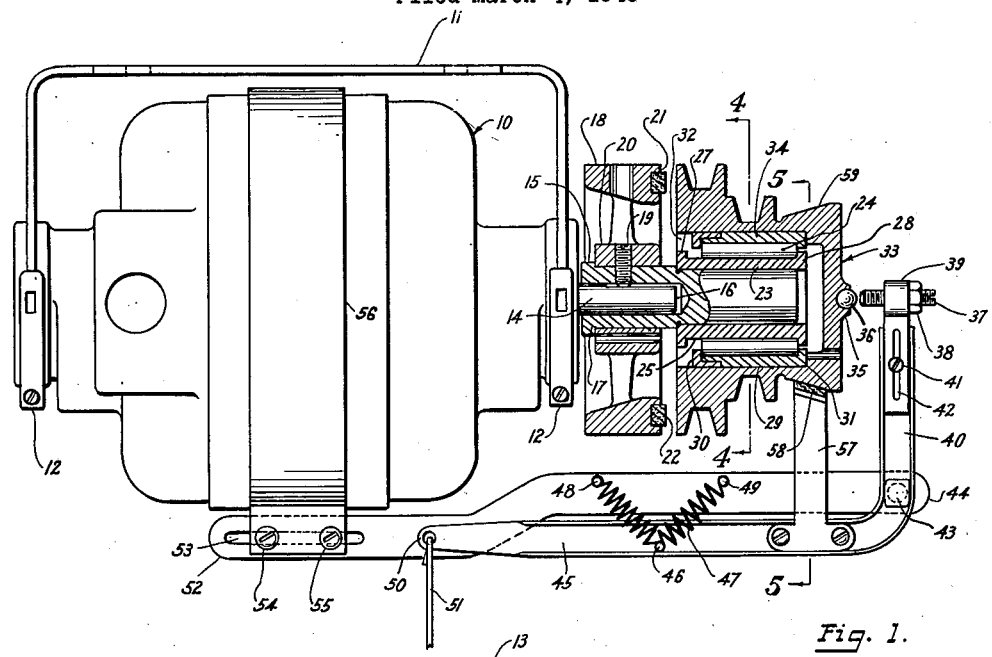
Figure 1 is an elevational view, partly in section, showing an assembly of motor and transmission mechanism in accordance with my invention, the complementary clutch members being disengaged.

In the drawings, the motor 10 is suspended from the bracket 11 through the medium of the hub clamps 12, the bracket being adapted for attachment to a suitable base or platform indicated by the dot-dash lines 13. Mounted over the motor shaft 14 is the clutch shaft 15—shaft 14 being disposed within the central recess 16 within sleeve portion 17 of said shaft 15. The said clutch shaft 15 is fixedly secured to shaft 14, as will hereinafter appear.

Mounted over the said sleeve portion 17 of shaft 15 is the drive plate 18, the screw 19 extending through the hub 20 of the plate member, through the sleeve portion 17, and into abutting engagement with shaft 14. The arrangement is hence such that upon a rotation of the motor, the drive plate 18 will be correspondingly rotatably actuated. The outer face 21 of drive plate 18 contains a friction or clutch ring 22 adapted for engagement with the driven member, as will hereinafter appear.

Fixedly mounted upon the outer portion of supporting shaft 15 is the bushing 23, preferably through a force fit. A plurality of roller bearings 24 are disposed about the outer surface 25 of bushing 23, the length of each of said rollers being a predetermined amount less than the distance between the end flanges 27 and 28 of the bushing. The arrangement is such that the rollers 24 may rotatably move around bushing 23, and also slidably move between the said flanges 27 and 28. Concentrically disposed around bushing 23, and spaced therefrom, is the ring 29, the space between the ring and bushing being sufficient to accommodate therebetween the said rollers 24. The said ring also is provided with end flanges 30 and 31, the distance between said flanges being substantially equal to the length of the rollers.

It will be observed that the flanges 27 and 28 of the bushing, and the flanges 30 and 31 of the ring are disposed towards each other, and cooperate to keep the rollers within the cage formed by the ring and the bushing. It will also be noted that end flange 30 of the ring is shown as a separate element, the purpose being to facilitate the assembly of the parts. The said ring 29 is force-fitted into the hollow chamber 32 of the pulley member 33, so that said ring and the internal wall 34 of the pulley are in fixed relation.

Figure 2:
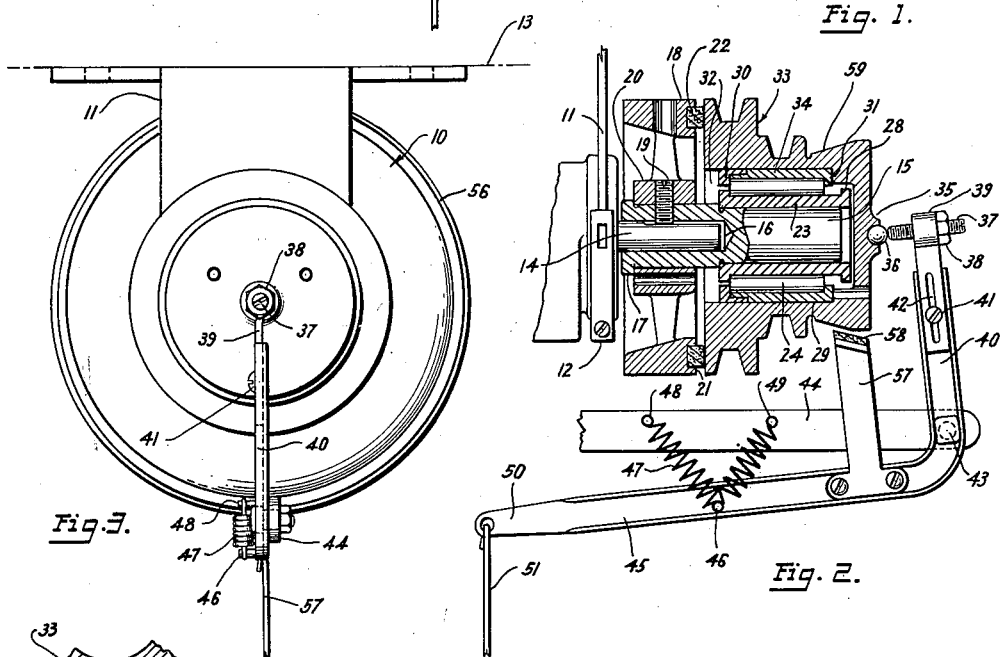
Figure 2 is a fragmentary part sectional, part elevational view of the device of Figure 1 with the complementary members in operative engagement.
Figure 3:
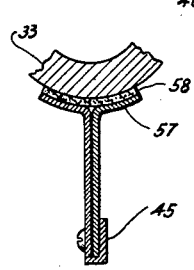
Figure 3 is an end view of Figure 1.
Figures 4, 5:
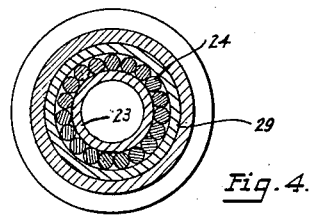
Figure 4 is a section of Figure 1 taken along line 4—4.
Figure 5 is a fragmentary section of Figure 1 taken along line 5—5, illustrating the brake structure.

It is thus apparent that when the pulley member 33 is out of engagement with the drive plate 18, the pulley will be capable of readily revolving about clutch shaft 15 through the medium of the roller-bearings 24. It is also apparent that if the said pulley member 33 were to be actuated in a direction parallel to its axis, it would slidably move all the rollers 24 along outer surface 25 of the bushing 23. As will appear from the description hereinafter given, means are provided for effectuating such movement, so that when the pulley member 33 is slidably brought into engagement with drive disc 18, flanges 27 and 30 will be in substantial registry, and the rollers 24 in their nearest position towards the motor (Figure 2); and when the said pulley member 33 is disengaged from the drive plate 18, the rollers 24 will be brought to their extreme outer position, with the flanges 28 and 31 in substantial registry (Figure 1).

The arrangement is hence such as to provide a roller cage with two concentric complementary members to house the rollers, the said members being movable relative to each other as the movable clutch member is actuated. And in either of the two positions of the complementary cage members, the rollers are in operable position.

In the form of my invention illustrated, the outer portion of the pulley member 33 contains a hub 35 supporting therein an outwardly protruding ball 36. In engagement with this ball is the stud 37 adjustably supported, through the medium of nut 38, by the bracket 39. This bracket is slidably positioned between the opposite legs of the channel member 40, the fastener 41, extending through the slot 42, holding the bracket 39 in any adjusted position with respect to channel member 40. The said channel member 40 is pivoted at 43 to the bar 44, the arm 45 of the channel member containing a pin 46 upon which is anchored the spring 47 attached to the pins 48 and 49 on the bar 44. The terminal portion 50 of the arm 45 is connected to a link 51 which is associated with a foot treadle or other actuating means for operating the arm 45 and associated parts.

The said bar 44 extends substantially in the general direction of the motor axis, the terminal portion 52 thereof containing a slot 53 through which extend two fasteners 54 and 55—these fasteners serving to secure to the bar 44 the band 56 which encircles the motor.

The said arm 45 supports the brake member 57 containing at the outer periphery thereof the lining 58 preferably in arcuate form. The said brake lining is adapted to engage the conical brake surface 59 of the pulley 33, as will hereinafter appear.

Normally, the spring 47 urges the arm 45 upwardly as shown in Figure 1, whereby the brake member 57 comes into contact with the said conical portion 59 of the pulley 33 to urge it outwardly, out of engagement with the drive disc 18, and to stop its motion. However, when the link 51 is pulled downwardly against the action of spring 47, the member 40 is actuated in a counter-clockwise direction, so that the stud 37, acting as an abutter, forces the pulley member 33 inwardly until it engages the clutch ring 22. It is obvious that when this occurs the rotating drive member 18 will cause the pulley member 33 to rotate with it—thereby causing any belt-connected mechanism associated with the pulley to be operatably actuated.

It is understood that the embodiment above described and shown in the drawings is illustrative of my invention and not employed by way of limitation, inasmuch as numerous changes and modifications may be made within the scope of the appended claims without departing from the spirit of this invention.

I claim:

1. In a transmission mechanism of the class having a stationary member and a member movable relative thereto between two limiting positions, roller bearing means comprising two complementary races and roller elements operatively disposed between said races, one of said races being stationary and connected to said stationary member, the other of said races being movable and connected to the said movable member, each of said races containing end flanges flanking said roller elements, the flanges on the movable race being in simultaneous embracing engagement with the opposite ends of said roller elements, whereby an operative movement of the movable race will be instantly and positively transmitted to the roller elements, the flanges on the stationary race being a greater distance apart than the flanges on the movable race, the difference in distance between the said flanges on the two complementary races being equal to the distance between said two limiting positions, the said roller elements being slidably movable along said stationary race between the said flanges thereof, said last-mentioned flanges being engageable with the said roller elements to limit the movement thereof and that of the movable race to said two limiting positions.

2. In a transmission mechanism of the class having a stationary member and a member movable relative thereto between two limiting positions, the combination according to claim 1, the flanges at one end of the said complementary races being substantially in one plane when the movable race is in one of its said limiting positions, and the flanges at the opposite end of the said complementary races being substantially in one plane when the movable race is at the other of its said limiting positions.

3. In a transmission mechanism of the class having a stationary member and a member movable relative thereto between two limiting positions, the combination according to claim 10, the said complementary races being cylindrical and in spaced concentric relation, the roller elements being circumferentially disposed between said races, the said operative movement of the movable race and the roller elements being axial with respect to the concentric cylindrical races.

LOUIS PALAZZO.

REFERENCES CITED

The following references are of record in the file of this patent:

UNITED STATES PATENTS

| Number | Name | Date |
|---|---|---|
| 668,166 | Diehl et al. | Feb. 19, 1901 |
| 1,527,158 | Edelman | Feb. 17, 1925 |
| 1,648,267 | Grossbard | Nov. 8, 1927 |
| 1,736,601 | Jones | Nov. 19, 1929 |
| 1,888,483 | Witthofft | Nov. 22, 1932 |
| 2,048,501 | Goosman | July 21, 1936 |
| 2,273,947 | Fischbein | Feb. 24, 1942 |

FOREIGN PATENTS

| Number | Country | Date |
|---|---|---|
| 6,059 | Great Britain | A. D. 1910 |
| 169,116 | Switzerland | May 15, 1934 |